UNITED STATES PATENT OFFICE.

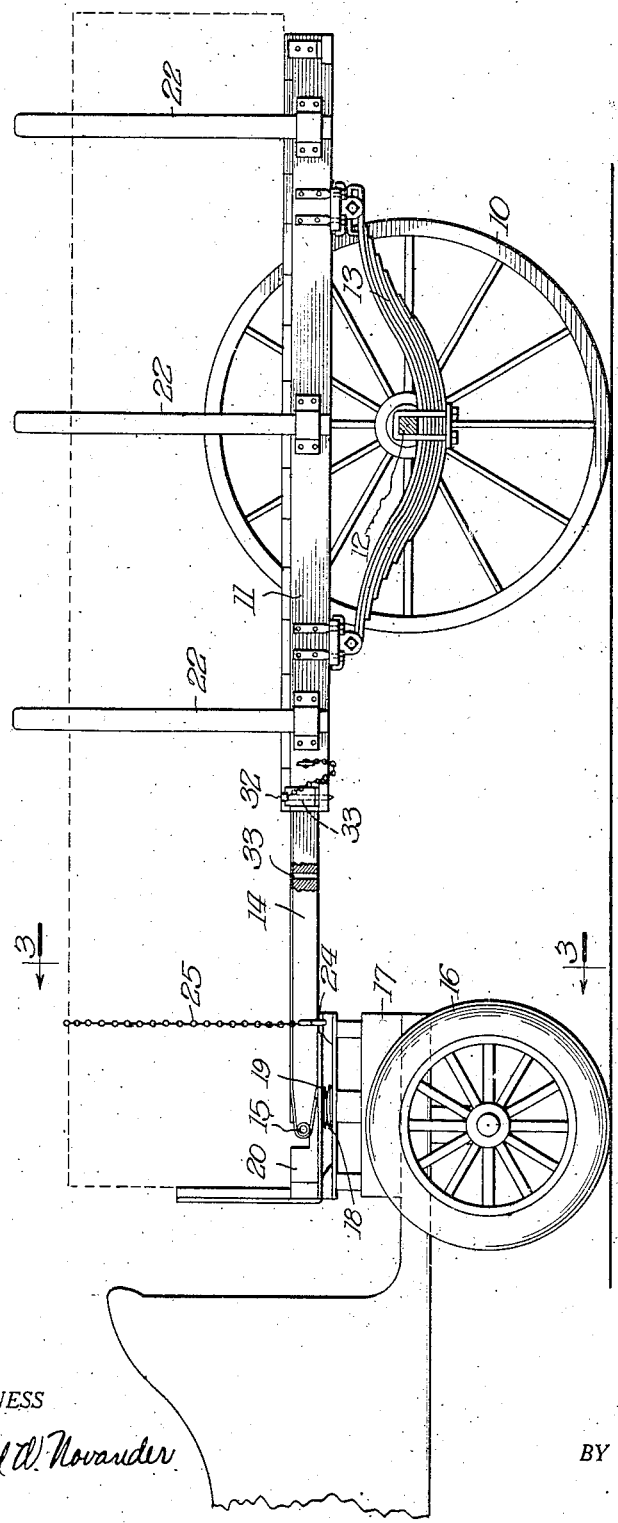

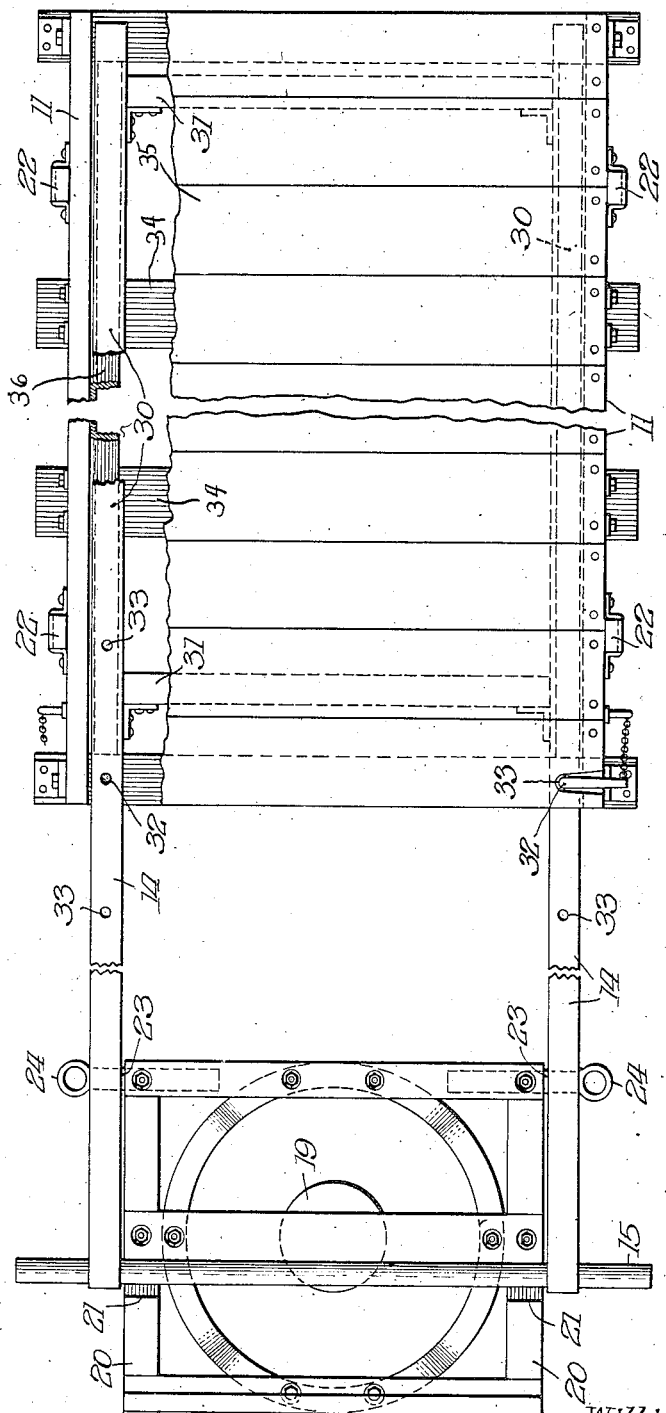

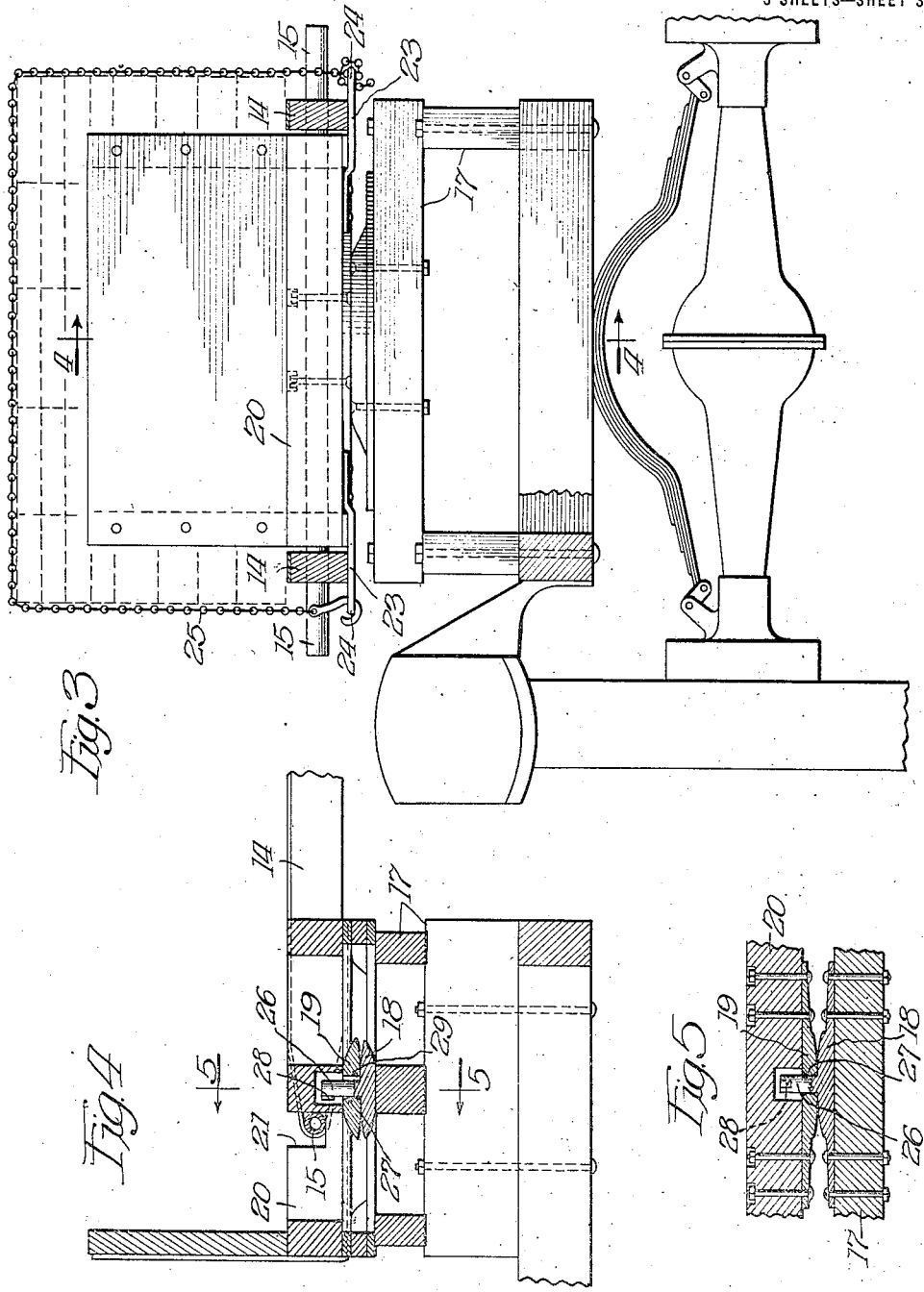

WILLIAM T. DAUM, OF OAK PARK, ILLINOIS.

AUTOMOBILE-TRAILER.

1,316,358.   Specification of Letters Patent.   Patented Sept. 16, 1919.

Application filed July 2, 1917. Serial No. 178,168.

*To all whom it may concern:*

Be it known that I, WILLIAM T. DAUM, a citizen of the United States, residing at Oak Park, in the county of Cook and State of Illinois, have invented certain new and useful Improvements in Automobile-Trailers, of which the following is a specification.

This invention relates to trailers to be used with automobiles or other vehicles, and particularly where a number of trailers are to be used with one or more automobiles, in order to facilitate loading or unloading goods, or for other purposes; and the general objects of the invention are to produce an improved trailer for general use and an improved combination of a trailer, a traction vehicle, and means for connecting the trailer and vehicle. Other objects of the invention will be apparent from a consideration of the following description of the invention.

In the accompanying drawings Figure 1 is an elevation of an automobile, with a trailer connected thereto, which embody the features of my invention. Fig. 2 is a plan view of the trailer and connecting means. Fig. 3 is a sectional view along the line 3—3 of Fig. 1. Fig. 4 is a sectional view along the line 4—4 of Fig. 3; and Fig. 5 is a fragmental sectional view along the line 5—5 of Fig. 4.

To illustrate my invention I will consider it as applied to lumber use; but it may be applied to many other uses equally as well. In lumber yards or in factories requiring the use of much lumber, considerable time is required to load and unload the lumber from trucks; and to obviate the need of the traction vehicle, or the tractor, standing idle during a large portion of the time it is desirable to have trailers which may readily be connected or disconnected from the tractor; and which, if desired, may be moved around more or less by hand, especially with light loads. For this purpose I provide a trailer comprising ordinary supporting wheels 10, and a frame 11 supported on the axle 12 of the wheels in any suitable manner, such as by springs 13. Fixed to the frame 11, in a manner hereinafter described, is a reach 14 which may be used as a handle for operating manually the trailer.

Any suitable traction means may be used. I prefer for the purpose automobiles or auto trucks, comprising rear wheels 16 supporting a frame 17, which in turn supports a rocking bolster comprising a lower plate 18 and an upper plate 19, and fixed to the upper plate is a frame 20. Notches 21 are provided in the frame 20, and these notches are adapted to receive the handle bar 15 of the trailer when the trailer is to be moved by the automobile.

When the trailer is to be loaded it is ordinarily separated from the tractor, and the reach is supported by any suitable means at a convenient height, and the lumber is piled ordinarily lengthwise with the trailer between the side stakes 22 and extending to or beyond the handle 15 if desired. The tractor is then backed under the reach, and the reach lowered so that the handle 15 passes into the notches 21. To hold the lumber firmly in place and to fasten the reach to the frame 20, straps 23 are fixed to the frame, the straps having rings 24, to which are fastened a chain 25 passing over the lumber. When fastened in this manner the handle 15 cannot be forced upwardly out of the notches 21. When the trailer is not loaded and it is desired to fasten it to the tractor the chain 25 is fastened to the rings 24 and wrapped around the reach. From this it will be seen that the reach and the handle 15 form a continuation of the frame 11 for supporting the lumber.

With a trailer fastened to the tractor as above described it becomes desirable to arrange for a very material amount of flexibility between the trailer and the tractor. To provide for this any suitable rocking bolster may be used. I prefer for the purpose a bolster without a king bolt, but instead having a pin 26 fixed to the lower plate 18, and passing freely through an opening 27 in the plate 19. A projection 28 fixed to the upper end of the pin 26 prevents the complete separation of the plates, except when turned through an angle of 180 degrees so as to cause the projection 28 to register with a slot 29 in the upper plate through which the projection may pass. By rounding the outer adjacent edges of the plates, and by having the projection 28 normally spaced somewhat from the upper surface of the plate 19 a degree of flexibility is obtained sufficient to allow the tractor and trailer to pass over very material depressions or elevations in the road without injury.

In order to adapt the trailer to lumber of different lengths or for other purposes, I provide means for making the reach extensible. The rear portion of the reach comprises a frame consisting of the longitudinal beams 30 and the cross beams 31 rigidly connected. This frame is longitudinally slidably mounted in the frame 11 of the trailer between the cross beams 34 and the floor 35, guided by an angle iron 36; and relative longitudinal movement of the two frames is prevented by means of pins 32 passing through the floor, the angle iron and the beams of both frames. A plurality of holes 33 provide means for adjusting the position of the reach frame with reference to the trailer frame so as to shorten or to lengthen the reach as desired.

I claim as my invention:

1. The combination of a tractor, a two-wheeled trailer, connecting means comprising a rocking bolster, and means for immovably, but detachably connecting the upper member of said bolster to said trailer.

2. The combination of a tractor, a trailer, connecting means comprising a rocking bolster, said bolster having a notch in its upper surface, a handle fixed to said trailer and extending transversely, said handle arranged to be placed in said notch, and adapted to hold lumber, and means for holding said handle in said notch, said latter means at the same time holding said lumber on said handle.

3. The combination of a tractor, a two-wheeled trailer, a rocking bolster mounted on said tractor, a reach extending forwardly from said trailer, and means for immovably but detachably fastening said reach to the upper member of said bolster.

4. The combination of a tractor, and a trailer, and means for connecting said trailer to said tractor; said means comprising an extensible reach fixed to said trailer, and adapted to hold lumber, and means for detachably connecting said lumber to said reach, said means also adapted to detachably connect said reach to said tractor.

5. The combination of a tractor, a trailer, a bolster mounted on said tractor, said trailer having a main body and an adjustable reach extending forwardly from said body, and means for detachably fastening said reach to the upper member of said bolster.

In testimony whereof I hereunto set my hand.

WILLIAM T. DAUM.